United States Patent
Otake

(10) Patent No.: US 11,851,517 B2
(45) Date of Patent: Dec. 26, 2023

(54) POLYMER DISPERSANT, COLORANT DISPERSION LIQUID, AND INK COMPOSITION

(71) Applicant: Seiko Epson Corporation, Tokyo (JP)

(72) Inventor: Toshihiro Otake, Chino (JP)

(73) Assignee: SEIKO EPSON CORPORATION

( * ) Notice: Subject to any disclaimer, the term of this patent is extended or adjusted under 35 U.S.C. 154(b) by 638 days.

(21) Appl. No.: 16/941,634

(22) Filed: Jul. 29, 2020

(65) Prior Publication Data

US 2021/0032394 A1  Feb. 4, 2021

(30) Foreign Application Priority Data

Jul. 30, 2019 (JP) .................. 2019-139629

(51) Int. Cl.
| | | |
|---|---|---|
| *C08F 293/00* | (2006.01) | |
| *C09D 11/107* | (2014.01) | |
| *C09D 11/326* | (2014.01) | |
| *C09K 23/32* | (2022.01) | |

(52) U.S. Cl.
CPC .......... *C08F 293/00* (2013.01); *C09D 11/107* (2013.01); *C09D 11/326* (2013.01); *C09K 23/32* (2022.01)

(58) Field of Classification Search
CPC ..... C08F 293/00; C09K 23/32; C09D 11/107; C09D 11/326
See application file for complete search history.

(56) References Cited

U.S. PATENT DOCUMENTS 6,576,684 B1 * 10/2003 Vincent ..................... C08F 2/50
522/167
10,174,184 B2   1/2019 Otake

FOREIGN PATENT DOCUMENTS

| CN | 101648132 A | * | 2/2010 | ............ B01J 20/285 |
| CN | 108570154 | * | 9/2018 | ............... C08H 1/00 |
| JP | H10-130555 A | | 5/1998 | |
| JP | H10-140063 A | | 5/1998 | |
| JP | 2009-197211 A | | 9/2009 | |
| JP | 5723532 B2 | * | 5/2015 | ............... C08K 5/00 |
| JP | 2016-098313 A | | 5/2016 | |
| JP | 2017-002096 A | | 1/2017 | |
| JP | 2018-072614 A | | 5/2018 | |
| JP | 2018-141065 A | | 9/2018 | |
| JP | 2019-127559 A | | 8/2019 | |

OTHER PUBLICATIONS

CN108570154A English translation (Year: 2018).*
He et al., Self-Assembly of Block Copolymer Micelles in an Ionic Liquid, J. Am. Chem. Soc. 2006, 128, 2745-2750. (Year: 2006).*
JP5723532B2 English translation (Year: 2015).*
CN101648132A English Translation (Year: 2010).*

* cited by examiner

*Primary Examiner* — Ling Siu Choi
*Assistant Examiner* — Huihong Qiao
(74) *Attorney, Agent, or Firm* — Harness, Dickey & Pierce, P.L.C.

(57) ABSTRACT

A polymer dispersant includes a first block; and a second block, the first block has a structural unit derived from a first monomer having an imidazolium salt portion and a hydrophobic portion, and the second block has a structural unit derived from a second monomer having an imidazolium salt portion and a hydrophilic portion.

12 Claims, No Drawings

POLYMER DISPERSANT, COLORANT DISPERSION LIQUID, AND INK COMPOSITION

The present application is based on, and claims priority from JP Application Serial Number 2019-139629, filed Jul. 30, 2019, the disclosure of which is hereby incorporated by reference herein in its entirety.

BACKGROUND

1. Technical Field

The present disclosure relates to a polymer dispersant, a colorant dispersion liquid, and an ink composition.

2. Related Art

In production of paint and ink, colorant dispersion is an important step. The degree of quality in colorant dispersion has influences, for example, on optical characteristics, such as a product gloss, a coloring power, and a hiding power; and rheological characteristics, such as a viscosity, a fluidity, a leveling property, and a flow property, and furthermore, also has influences on an aging stability, such as generation of sediments and/or aggregates.

Accordingly, a technique in which a colorant to be contained in a paint or an ink is covered with a dispersant has been proposed. For example, JP-A-2017-002096 has disclosed an ink jet recording ink in which pigment particles are dispersed by a styrene-acrylic acid-based resin.

Although the dispersant resin disclosed in JP-A-2017-002096 enables the pigment to disperse, it may not be said that in the case in which the ink is adhered to a recording medium, a sufficient investigation has been carried out on a fixing property of the pigment to the recording medium.

SUMMARY

According to an aspect of the present disclosure, there is provided a polymer dispersant which comprises: a first block; and a second block. In the polymer dispersant described above, the first block includes a structural unit derived from a first monomer having an imidazolium salt portion and a hydrophobic portion, and the second block includes a structural unit derived from a second monomer having an imidazolium salt portion and a hydrophilic portion.

In the polymer dispersant described above, the hydrophobic portion of the first monomer may contain an alkyl carboxylate group, a cycloalkyl carboxylate group, or an aryl carboxylate group.

In the polymer dispersant described above, the first monomer may be a compound represented by the following formula (I).

[Chem. 1]

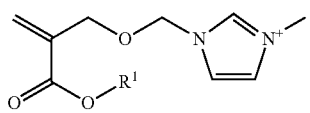

(I)

In the formula (I), $R^1$ represents a linear or a branched alkyl group having at least two carbon atoms, a cycloalkyl group having at least three carbon atoms, or an aryl group.

In any one of the polymer dispersants described above, the hydrophilic portion of the second monomer may contain an oligooxyethylene group, a carboxy group, a sulfonic acid group, or a phosphoric acid group.

In any one of the polymer dispersants described above, the second monomer may be a compound represented by the following formula (II).

[Chem. 2]

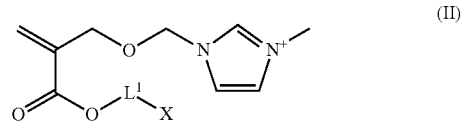

(II)

In the formula (II), $L^1$ is not present or represents a linear or a branched alkylene group having one to six carbon atoms or an oligooxyethylene group, and X represents a hydrogen atom, a carboxy group, a sulfonic acid group, or a phosphoric acid group.

Any one of the polymer dispersants described above may further comprise a third block, and the third block may include a structural unit derived from a third monomer having a cationic portion.

In the polymer dispersant described above, at least one of ammonium, pyridinium, and imidazolium each derived from the cationic portion may be generated in a solvent.

In any one of the polymer dispersants described above, the first block may have a branched structure.

In any one of the polymer dispersants described above, the second block may have a branched structure.

Any one of the polymer dispersants described above may have a number average molecular weight (Mn) of 8,000 to 20,000 which is measured by a gel permeation chromatography.

According to another aspect of the present disclosure, there is provided a colorant dispersion liquid which comprises: a colorant; a liquid medium; and any one of the polymer dispersants described above.

According to another aspect of the present disclosure, there is provided an ink composition which comprises the colorant dispersion liquid described above.

DESCRIPTION OF EXEMPLARY EMBODIMENTS

Hereinafter, embodiments of the present disclosure will be described. In the following embodiments, examples of the present disclosure will be described. The present disclosure is not limited to the following embodiments, and various modified examples to be performed without departing from the scope of the present disclosure may also be included as the embodiments. In addition, all the structures which will be described below are not always required to be essential structures of the present disclosure.

In this specification, "(meth)acryl" indicates an acryl and a methacryl, and "(meth)acrylate" indicates an acrylate and a methacrylate.

1. Polymer Dispersant

A polymer dispersant according to one embodiment of the present disclosure includes a first block and a second block.

The first block described above includes a structural unit derived from a first monomer having an imidazolium salt portion and a hydrophobic portion, and the second block includes a structural unit derived from a second monomer having an imidazolium salt portion and a hydrophilic portion.

Hereinafter, the structure of the polymer dispersant according to this embodiment, synthetic methods of the monomers and the polymer dispersant, a molecular weight of the polymer dispersant, the application thereof, and the like will be described.

1.1. Structure of Polymer Dispersant

The polymer dispersant includes a first block and a second block.

1.1.1. First Block

The first block is a portion having an affinity to a colorant as compared to the second block. The first block includes a structural unit derived from a first monomer having an imidazolium salt portion and a hydrophobic portion.

The imidazolium salt portion of the first monomer is a portion having a salt structure formed of a cation having an imidazole ring, and for example, a portion having the structure of a monoalkylimidazolium salt, a dialkylimidazolium salt, or a trialkylimidazolium salt may be mentioned. In addition, the number of carbon atoms of the alkyl group of the imidazolium salt mentioned above by way of example and the position thereof to which the alkyl group is bonded are not particularly limited. In addition, the imidazolium salt portion may contain a plurality of imidazole rings.

In addition, a counter anion of the imidazolium salt portion is not particularly limited, and for example, there may be mentioned chlorine, bromine, boron tetrafluoride, or phosphorus hexafluoride.

As the hydrophobic portion of the first monomer, a portion containing an alkyl group, a cycloalkyl group, an aryl group, or the like may be mentioned. Those groups each may be introduced in the first monomer by an ester bond, and in this case, those groups each may be present in the form, for example, of an acid alkyl ester group, an acid cycloalkyl ester group, or an acid aryl ester group. When the acid of the ester group is a carboxylic acid, for example, the alkyl group, the cycloalkyl group, and the aryl group may be contained in the first monomer as an alkyl carboxylate group, a cycloalkyl carboxylate group, and an aryl carboxylate group, respectively.

The first monomer has a polymerizable property. When the first monomer is polymerized, the first block of the polymer dispersant of this embodiment is formed. A polymerizable portion of the first monomer is, for example, a carbon-carbon double bond. Hence, the first monomer can be, for example, a derivative of (meth)acrylic acid, a vinyl compound, or the like. For example, as the first monomer, an alkyl ester compound of methacrylic acid in which an imidazolium salt structure is bonded to a carbon located at a meta position may be used.

From another aspect, as the first monomer, a compound represented by the following formula (I) may be mentioned.

[Chem. 3]

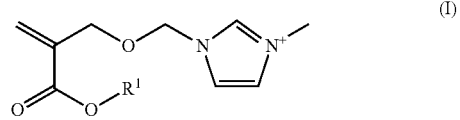

(I)

In the formula (I), $R^1$ indicates a linear or branched alkyl group having at least two carbon atoms, a cycloalkyl group having at least three carbon atoms, or an aryl group.

In addition, $R^1$ of the formula (I) has more preferably three to 10 carbon atoms and further preferably four to eight carbon atoms. When the number of carbon atoms is set in the range as described above, a sufficient hydrophobic property can be imparted to the hydrophobic portion of the first monomer. In addition, $R^1$ of the formula (I) more preferably has a branched chain. Since $R^1$ has a branched structure, molecular mobility of the hydrophobic portion is enhanced, and when the polymer dispersant is applied to a colorant dispersion liquid, the viscosity of the colorant dispersion liquid can be decreased lower than the viscosity of a linear chain having the same number of carbon atoms as described above. In addition, since $R^1$ has a branched structure, a bulk height of the hydrophobic portion can be increased, and hence, there may be obtained in some cases a hydrophobic property higher than that to be expected when a linear chain having the same number of carbon atoms as described above is used.

As the first monomer, one type of material may be used alone, or at least two types of materials may be used in combination. The first block is formed by polymerization between adjacent first monomers. The first block is a part of a block copolymer structure of the polymer dispersant of this embodiment. The length of the first block along a main chain of the polymer dispersant is, as the number of structural units derived from the first monomer, for example, 2 to 1,000, preferably 10 to 800, and more preferably 100 to 500. The polymer dispersant of this embodiment may include a plurality of the first blocks.

The rate of the structural units derived from the first monomer to all the structural units forming the polymer dispersant of this embodiment is preferably 30.0 to 50.0 percent by mole, more preferably 35.0 to 45.0 percent by mole, further preferably 38.0 to 42.0 percent by mole, and particularly preferably 40.0 percent by mole. When the rate of the structural units derived from the first monomer is in the range described above, the stability of the colorant dispersion liquid is likely to be improved, and sedimentation of the colorant can be effectively suppressed.

1.1.2. Second Block

The second block is a portion having, compared to the first block, a low affinity to the colorant and an excellent affinity to an aqueous medium. The second block includes a structural unit derived from a second monomer having an imidazolium salt portion and a hydrophilic portion.

The imidazolium salt portion of the second monomer is similar to that described in the above first block.

As the hydrophilic portion of the second monomer, a portion containing an oligooxyethylene group, a carboxy group, a sulfonic acid group, a phosphoric acid group, or the like may be mentioned. Those groups each may be introduced in the second monomer by an ester bond or with an appropriate linker chain interposed therebetween.

The second monomer has a polymerizable property. Since the second monomer is polymerized, the second block of the polymer dispersant of this embodiment is formed. A polymerization portion of the second monomer is, for example, a carbon-carbon double bond. Hence, as the second monomer, for example, a derivative of (meth)acrylic acid, a vinyl compound, or the like may be used. For example, as the second monomer, a carboxy alkyl ester compound of methacrylic acid in which an imidazolium salt structure is bonded to a carbon located at a meta position may be used.

From another aspect, as the second monomer, a compound represented by the following formula (II) may be mentioned by way of example.

[Chem. 4]

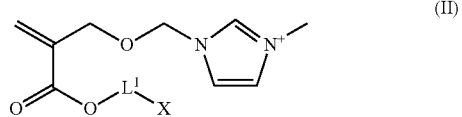

(II)

In the formula (II), $L^1$ is not present or represents a linear or a branched alkylene group having one to six carbon atoms or an oligooxyethylene group, and X represents a hydrogen atom, a carboxy group, a sulfonic acid group, or a phosphoric acid group. However, when $L^1$ is not present, X in the formula (II) represents a hydrogen atom, and when $L^1$ represents an alkylene group, X is not a hydrogen atom.

When $L^1$ in the formula (II) represents an alkylene group, the number of carbon atoms is more preferably two to three. When $L^1$ in the formula (II) represents an oligooxyethylene group, the number of oxyethylene repeating units is preferably two to 10 and more preferably three to eight. Furthermore, X in the formula (II) more preferably represents a carboxy group or a sulfonic acid group. When the compound represented by the formula (II) as described above is used, a sufficient hydrophilic property can be imparted to the hydrophilic portion of the second monomer.

In addition, $L^1$ in the formula (II) more preferably has a branch. When $L^1$ has a branched structure, the molecular mobility of the hydrophilic portion is enhanced, and when the polymer dispersant is applied to the colorant dispersion liquid, the viscosity thereof can be further decreased. In addition, when $L^1$ has a branched structure, packing of the hydrophilic portion can be loosened, and the affinity to water molecules is increased, so that the hydrophilic property may be further enhanced in some cases.

As the second monomer, one type of material may be used alone, or at least two types of materials may be used in combination. The second block is formed by polymerization between adjacent second monomers. The second block is a part of the block copolymer structure of the polymer dispersant of this embodiment. The length of the second block along the main chain of the polymer dispersant is, as the number of structural units derived from the second monomer, for example, 2 to 1,000, preferably 10 to 800, and more preferably 100 to 500. The polymer dispersant of this embodiment may include a plurality of the second blocks.

The rate of the structural units derived from the second monomer to all the structural units forming the polymer dispersant of this embodiment is preferably 50.0 to 70.0 percent by mole, more preferably 55.0 to 65.0 percent by mole, further preferably 58.0 to 62.0 percent by mole, and particularly preferably 60.0 percent by mole. When the rate of the structural units derived from the second monomer is in the range described above, the stability of the colorant dispersion liquid is likely to be improved, and the sedimentation of the colorant can be effectively suppressed.

1.1.3. Third Block

The polymer dispersant according to this embodiment may include, besides the first block and the second block described above, a third block.

In the case in which the polymer dispersant includes the third block, when the polymer dispersant is applied to an ink composition, redispersibility after drying can be enhanced. The reason for this is believed that by the function of a cationic group of the third block, aggregated colorant particles can be disentangled from each other. In addition, in the case in which the polymer dispersant includes the third block, when the polymer dispersant is applied to the colorant dispersion liquid, the viscosity thereof can be decreased low. Furthermore, in the case in which the polymer dispersant includes the third block, when the polymer dispersant is applied to an ink composition, bleeding can be suppressed, and an ink composition having an excellent color development property can be realized. For example, when the polymer dispersant is applied to a sublimation transfer type ink composition, if having a cationic portion, the polymer dispersant has a high affinity to fibers formed of proteins, such as a cotton or a hemp; hence, a dye or a pigment is suppressed from appearing on the surface after printing, and blurring (bleeding) caused by retransfer can be suppressed.

The third block includes a structural unit derived from a third monomer having a cationic portion.

As the cationic portion of the third monomer, a portion which generates in a solvent, at least one of ammonium, pyridinium, and imidazolium may be mentioned. Hence, in the third monomer, the structure of an amine, a pyridine, an imidazole, or the like is included.

The third monomer has a polymerizable property. Since the third monomer is polymerized, the third block of the polymer dispersant of this embodiment is formed. A polymerizable portion of the third monomer is, for example, a carbon-carbon double bond. Hence, as the third monomer, for example, a compound having a vinyl group or a derivative of (meth)acrylic acid may be used. For example, as the third monomer, acrylamide, 2-vinylpyridine, 4-vinylpyridine, or N-benzylacrylamide may be mentioned.

When the third monomer is used, one type of material may be used alone, or at least two types of materials may be used in combination. The third block is formed by polymerization between adjacent third monomers. When being included, the third block is a part of the block copolymer structure of the polymer dispersant of this embodiment. The length of the third block along the main chain of the polymer dispersant is, as the number of structural units derived from the third monomer, for example, 2 to 1,000, preferably 10 to 800, and more preferably 100 to 500. The polymer dispersant of this embodiment may include a plurality of the third blocks.

When the third monomer is used, the rate of the structural units derived from the third monomer to all the structural units forming the polymer dispersant according to this embodiment is preferably 5.0 to 20.0 percent by mole, more preferably 5.0 to 10.0 percent by mole, further preferably 7.0 to 10.0 percent by mole, and particularly preferably 8.0 percent by mole. When the rate of the structural units derived from the third monomer is in the range described above, in the case of the colorant dispersion liquid is formed, the viscosity thereof can be further decreased, and the redispersibility in the ink composition can be further improved.

1.1.4. Synthesis of Monomer

As the first monomer and the second monomer, commercially available products may be used, or monomers synthesized by general organic synthesis methods may also be used.

1.2. Synthesis of Polymer Dispersant

The polymer dispersant according to this embodiment may be synthesized such that a relatively high hydrophobic first block formed by polymerization of the first monomer and a relatively high hydrophilic second block formed by polymerization of the second monomer are bonded to each other.

A synthetic method of a block copolymer is not particularly limited, and although various methods may be used, the synthesis is preferably performed by a living radical polymerization method.

In a block copolymer obtained by a living radical polymerization method, compared to a general block copolymer, the first block and the second block are clearly segmented from each other, and the features of the individual blocks (segments) are likely to be obtained.

Accordingly, the polymer dispersant to be obtained can be made to have excellent adhesion to the colorant and excellent affinity to the aqueous medium, so that when the colorant is dispersed in the aqueous medium, the dispersion stability of the colorant and the storage stability of a dispersion liquid including the colorant can be further improved.

1.3. Number Average Molecular Weight and Variance Ratio

The lower limit of a number average molecular weight (Mn) of the polymer dispersant according to this embodiment is preferably 8,000, more preferably 9,000, and particularly preferably 10,000. In addition, the upper limit of the number average molecular weight (Mn) of the polymer dispersant according to this embodiment is preferably 20,000, more preferably 18,000, and particularly preferably 16,000. When the number average molecular weight (Mn) of the polymer dispersant is in the range described above, in the case in which the colorant is dispersed in the aqueous medium, the dispersion stability of the colorant and the storage stability of the dispersion liquid including the colorant can be further improved. In addition, when the polymer dispersant according to this embodiment is used for an ink composition which will be described later, the ejection stability thereof by an ink jet method can be further improved. In addition, the number average molecular weight (Mn) of the polymer dispersant indicates a polystyrene-based number average molecular weight measured by a gel permeation chromatography (GPC).

In addition, a weight average molecular weight (Mw)/number average molecular weight (Mn) of the polymer dispersant according to this embodiment, that is, the variance ratio, is preferably 1.1 to 2.0, more preferably 1.1 to 1.8, and further preferably 1.1 to 1.5. In general, the value of the variance ratio is believed to indicate the degree of spread of molecular weight distribution, and a value closer to 1 indicates a narrower molecular weight distribution.

Since the polymer dispersant according to this embodiment has the spread of the molecular weight distribution in the range described above, when the colorant is dispersed in the aqueous medium, the dispersion stability of the colorant and the storage stability of the dispersion liquid including the colorant can be further improved.

1.4. Application

The polymer dispersant according to this embodiment may be used as a dispersant which disperses solid particles, such as inorganic particles or organic particles, in an aqueous medium. Although the inorganic particles are not particularly limited, inorganic particles, such as silica, titania, or alumina, may be mentioned. As the organic particles, besides colorants, such as a pigment and a dye, organic particles having hydrophobic surfaces may be mentioned. Among those mentioned above, since an increase in viscosity and a gelation caused by addition of the polymer dispersant can be suppressed, the polymer dispersant according to this embodiment is particularly preferably used as a dispersant for a colorant, such as a pigment or a dye, to be used for an aqueous ink jet ink.

1.5. Operational Effect

In the polymer dispersant according to this embodiment, since the functions of the first block and the second block are concentrated in the molecule, the hydrophilic and hydrophobic functions are amplified. That is, in a molecular chain of the polymer dispersant, the first monomers and the second monomers are not arranged at random but arranged to form a block structure. Hence, the hydrophobic property derived from the first monomer is enhanced by the first monomers arranged adjacent to each other, and the hydrophilic property derived from the second monomer is enhanced by the second monomers arranged adjacent to each other. As a result, the interaction with the colorant is enhanced, the dispersion is stabilized, and hence, aggregation and sedimentation can be suppressed.

In addition, since the effect described above can be obtained with a small amount of the polymer dispersant according to this embodiment as compared to that of a related resin dispersant, even when the polymer dispersant according to this embodiment is used in an amount to obtain sufficient dispersion of the colorant, the viscosity of the colorant dispersion liquid can be maintained low. Furthermore, when being used for the colorant dispersion liquid, the polymer dispersant according to this embodiment has, because of its molecular structure, an effect so as not to excessively increase the viscosity of the colorant dispersion liquid.

In addition, the polymer dispersant according to this embodiment has imidazolium salt portions both in the first block and the second block. Hence, an ink composition excellent in rubbing fastness to a recording medium can be manufactured. This effect is significant when the recording medium contains cellulose fibers.

2. Colorant Dispersion Liquid

Next, a colorant dispersion liquid according to one embodiment of the present disclosure will be described.

The colorant dispersion liquid according to this embodiment includes a colorant, an aqueous medium, and the polymer dispersant described above. Since including the polymer dispersant described above, the colorant dispersion liquid according to this embodiment is excellent in dispersion stability and storage stability of the colorant and can also suppress an increase in viscosity.

In addition, in this specification, the colorant dispersion liquid indicates a liquid in which a colorant is dispersed in a dispersion medium and is a concept including, for example, a stock solution of an ink to be used for production of an ink composition which will be described below.

Colorant

As the colorant, for example, various pigments and various disperse dyes may be mentioned. The colorants as mentioned above generally have a high hydrophobic property, and when the polymer dispersant described above is applied thereto, the colorants are excellent in adhesion to the first block of the polymer dispersant. Hence, the effect as described above can be obtained.

As the pigments described above, for example, there may be mentioned black pigments, such as carbon black; cyan-based pigments, such as C.I. Pigment Blue 1, 2, 3, 15:3, 15:4, 15:34, 16, 22, and 60, and C.I. Vat Blue 4 and 60; magenta-based pigments, such as C.I. Pigment Red 5, 7, 12, 48(Ca), 48(Mn), 57(Ca), 57:1, 112, 122, 123, 168, 184, and 202, C.I. Pigment Violet 19; yellow-based pigments, such as C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, and 185; orange-based pigments, such as C.I. Pigment Orange and 43; and green-based pigments, such as C.I. Pigment Green 7 and 36.

As the disperse dyes described above, for example, C.I. Disperse Yellow 3, 7, 8, 23, 39, 51, 54, 60, 71, and 86; C.I. Disperse Orange 1, 1:1, 5, 20, 25, 25:1, 33, 56, and 76; C.I. Disperse Brown 2; C.I. Disperse Red 11, 50, 53, 55, 55:1, 59, 60, 65, 70, 75, 93, 146, 158, 190, 190:1, 207, 239, and 240; C.I. Vat Red 41; C.I. Disperse Violet 8, 17, 23, 27, 28, 29, 36, and 57; C.I. Disperse Blue 19, 26, 26:1, 35, 55, 56, 58, 64, 64:1, 72, 72:1, 81, 81:1, 91, 95, 108, 131, 141, 145, and 359; and C.I. Solvent Blue 36, 63, 105, and 111.

In addition, the colorant dispersion liquid according to this embodiment may include a plurality of colorants.

The lower limit of the content of the colorant in the colorant dispersion liquid according to this embodiment is preferably 0.2 percent by mass, more preferably 0.3 percent by mass, and particularly preferably 0.5 percent by mass. In addition, the upper limit of the content of the colorant in the colorant dispersion liquid according to this embodiment is preferably 30 percent by mass, more preferably 25 percent by mass, and particularly preferably 20 percent by mass.

When the content of the colorant is in the range described above, a more excellent color development property can be obtained, and in addition, the dispersion stability of the colorant in the colorant dispersion liquid and the storage stability thereof are further improved. In addition, when an ink jet ink is manufactured using this colorant dispersion liquid, a particularly excellent ejection stability can be obtained.

Polymer Dispersant

The colorant dispersion liquid according to this embodiment includes the polymer dispersant described above. Accordingly, the effect described above can be obtained. In addition, the colorant dispersion liquid according to this embodiment may include a plurality of polymer dispersants.

The lower limit of the content of the polymer dispersant in the colorant dispersion liquid according to this embodiment is preferably 0.2 percent by mass, more preferably 0.3 percent by mass, and particularly preferably 0.4 percent by mass. In addition, the upper limit of the content of the polymer dispersant in the colorant dispersion liquid according to this embodiment is preferably 30 percent by mass, more preferably 20 percent by mass, and particularly preferably 15 percent by mass.

When the content of the polymer dispersant in the colorant dispersion liquid according to this embodiment is in the range described above, the dispersion stability of the colorant in the colorant dispersion liquid and the storage stability thereof are further improved. In addition, when this colorant dispersion liquid is applied to an ink composition which will be described later, the ejection stability thereof by an ink jet method can be further improved.

In the colorant dispersion liquid according to this embodiment, when a content of the colorant is represented by XD [percent by mass], and a content of the polymer dispersant is represented by XB [percent by mass], the lower limit of XB/XD is preferably 0.3, more preferably 0.5, and particularly preferably 0.6. The upper limit of XB/XD is preferably 2.0, more preferably 1.5, and particularly preferably 1.2.

When the relationship described above is satisfied, the dispersion stability of the colorant and the storage stability of the colorant dispersion liquid are further improved. In addition, when the colorant dispersion liquid is applied to an ink composition which will be described later, the ejection stability thereof by an ink jet method can be further improved.

Aqueous Medium

The colorant dispersion liquid according to this embodiment includes the aqueous medium. As the aqueous medium, water or a mixed solvent containing water and a hydrophilic solvent may be mentioned. The hydrophilic solvent indicates a solvent having a solubility of at least 10 g/100 g of water at 25° C.

Although not particularly limited, the lower limit of the content of the water in the colorant dispersion liquid according to this embodiment is preferably 30 percent by mass, more preferably 35 percent by mass, and particularly preferably 40 percent by mass. In addition, although not particularly limited, the upper limit of the content of the water in the colorant dispersion liquid according to this embodiment is preferably 85 percent by mass, more preferably 80 percent by mass, and particularly preferably 75 percent by mass. Accordingly, the viscosity of the colorant dispersion liquid can be more reliably adjusted to a preferable value.

In addition, since the colorant dispersion liquid according to this embodiment includes a hydrophilic solvent as the solvent other than water, the viscosity of the colorant dispersion liquid can be preferably adjusted. In addition, a moisture retention property of the colorant dispersion liquid may also be increased. As a result, when the colorant dispersion liquid is applied to an ink composition, and in particular, to an ink jet ink composition, liquid droplet ejection by an ink jet method can be stably performed.

The hydrophilic solvent itself is a liquid at room temperature (25° C.), and the lower limit of a standard boiling point thereof is preferably 180° C., more preferably 185° C., and particularly preferably 190° C. In addition, the upper limit of the standard boiling point of the hydrophilic solvent is preferably 320° C., more preferably 310° C., and particularly preferably 300° C.

As the hydrophilic solvent described above, for example, there may be mentioned glycerin, propylene glycol, or 2-pyrrolidone. Since the hydrophilic solvents as described above are each included, an evaporation rate can be decreased due to an excellent moisture retention performance, and in an ink composition to which the colorant dispersion liquid according to this embodiment is applied, the liquid droplet ejection can be more stably performed. In addition, the colorant dispersion liquid according to this embodiment may include a plurality of solvents as the hydrophilic solvent.

The lower limit of the content of the hydrophilic solvent in the colorant dispersion liquid according to this embodiment is preferably 0 percent by mass, more preferably 10 percent by mass, and particularly preferably 15 percent by mass. In addition, the upper limit of the content of the hydrophilic solvent in the colorant dispersion liquid according to this embodiment is preferably 45 percent by mass, more preferably 43 percent by mass, and particularly preferably 40 percent by mass. Accordingly, an effect obtained by including the hydrophilic solvent described above can be more significantly obtained.

Surfactant

The colorant dispersion liquid according to this embodiment may include a surfactant. Accordingly, a wettability of the colorant dispersion liquid and that of an ink composition using the same to a recording medium can be made more preferable. As a result, for example, the quality of an image to be formed using the ink composition can be made more preferable.

As the surfactant, for example, various surfactants, such as an anionic surfactant, a cationic surfactant, and a nonionic surfactant, may be used. In more particular, as the surfactant described above, for example, an acetylene-based surfactant, a silicon-based surfactant, or a fluorine-based surfactant may be mentioned.

When the colorant dispersion liquid according to this embodiment includes a silicone-based surfactant, the wettability of the colorant dispersion liquid and that of an ink composition using the same to a recording medium can be made more preferable, and the effect described above can be more significantly obtained.

When the colorant dispersion liquid according to this embodiment includes a silicone-based surfactant, the lower limit of the content of the silicone-based surfactant with respect to 100 parts by mass of the colorant is preferably 5.0 parts by mass, more preferably 7.0 parts by mass, and particularly preferably 10 parts by mass. In addition, the upper limit of the content of the silicone-based surfactant with respect to 100 parts by mass of the colorant is preferably 150 parts by mass, more preferably 140 parts by mass, and particularly preferably 70 parts by mass. Accordingly, an effect obtained by including the silicone-based surfactant described above can be more significantly obtained.

As a commercially available silicone-based surfactant, for example, there may be mentioned BYK-306, BYK-307, BYK-333, BYK-337, BYK-341, BYK-345, BYK-346, BYK-347, BYK-348, BYK-349, or BYK-378 (trade name, manufactured by BYK Japan KK), or KF-351A, KF-352A, KF-353, KF-354L, KF-355A, KF-615A, KF-640, KF-642, KF-643, KF-945, KF-6020, X-22-4515, KF-6011, KF-6012, KF-6015, or KF-6017 (trade name, manufactured by Shin-Etsu Chemical Co., Ltd.).

Other Components

The colorant dispersion liquid according to this embodiment may include at least one component other than the components described above. As the at least one component, for example, there may be mentioned a dispersant other than the polymer dispersant described above, a penetrant, such as triethylene glycol monomethyl ether, triethylene glycol monobutyl ether, diethylene glycol monomethyl ether, 1,2-hexanediol, 1,2-pentanediol, 1,2-butanediol, or 3-methyl-1,5-pentanediol, a pH adjuster, a chelating agent, such as ethylenediaminetetraacetatic acid salt (EDTA), an antiseptic agent/fungicide, an antirust agent, an antioxidant, an UV absorber, an oxygen absorber, a solubilizing agent, and/or an urea. As the antiseptic agent/fungicide, for example, a compound having in its molecule, an isothiazolin cyclic structure may be preferably used.

The lower limit of the viscosity of the colorant dispersion liquid according to this embodiment at 25° C. is preferably 2 mPa·s, more preferably 3 mPa·s, and particularly preferably 4 mPa·s. In addition, the upper limit of the viscosity of the colorant dispersion liquid according to this embodiment at 25° C. is preferably 30 mPa·s, more preferably 20 mPa·s, and particularly preferably 15 mPa·s. Accordingly, the fluidity of the colorant dispersion liquid can be made appropriately excellent. In addition, an ink composition using the colorant dispersion liquid according to this embodiment can be easily adjusted to have a preferable ejection stability by an ink jet method.

In addition, the viscosity can be measured at 25° C. using a viscoelastic tester, such as MCR-300 manufactured by Pysica, by reading a viscosity at a shear rate of 10 $[s^{-1}]$.

3. Ink Composition

Next, an ink composition according to one embodiment of the present disclosure will be described.

The ink composition according to this embodiment includes the colorant dispersion liquid described above. Accordingly, the dispersion stability and the storage stability of the colorant are excellent, and in addition, an ink composition which suppresses an increase in viscosity and gelation can be provided.

In addition, the ink composition according to this embodiment may be any of an ink composition formed only from the colorant dispersion liquid described above, an ink composition prepared by addition of other components, such as a dilution solvent, to the colorant dispersion liquid described above, and an ink composition prepared by mixing at least two types of the colorant dispersion liquids described above.

The ink composition according to this embodiment is an aqueous ink composition and is particularly preferably an aqueous ink jet ink composition.

Since being excellent in dispersion stability and storage stability of the colorant, the ink composition according to this embodiment can effectively suppress unfavorable aggregation and/or sedimentation of the colorant even in the case of long-term storage. As a result, even when ejection is performed by an ink jet method, for example, ejection defects are not likely to occur. Hence, when the present disclosure is applied to an ink jet ink composition, the effect of the present disclosure can be more significantly obtained. In addition, the ink composition according to this embodiment may include at least two types of polymer dispersants.

The lower limit of the content of the polymer dispersant in the ink composition according to this embodiment is preferably 0.1 parts by mass, more preferably 0.2 parts by mass, and particularly preferably 0.4 parts by mass. In addition, the upper limit of the content of the polymer dispersant is preferably 30 parts by mass, more preferably 18 parts by mass, and particularly preferably 10 parts by mass. When the content of the polymer dispersant is in the range described above, the dispersion stability of the colorant in the ink composition and the storage stability thereof can be further improved. In addition, when this ink composition is used as an ink jet ink, a particularly excellent ejection stability can be obtained.

The lower limit of the content of the colorant in the ink composition according to this embodiment is preferably 0.1 percent by mass, more preferably 0.3 percent by mass, and particularly preferably 0.5 percent by mass. In addition, the upper limit of the content of the colorant is preferably 30 percent by mass, more preferably 15 percent by mass, and particularly preferably 8.0 percent by mass. When the content of the colorant is in the range described above, a more excellent color development property can be obtained, and in addition, the dispersion stability of the colorant in the ink composition and the storage stability thereof can be further improved. In addition, when this ink composition is used as an ink jet ink composition, a particularly excellent ejection stability can be obtained.

In the ink composition, when the content of the colorant is represented by XD [percent by mass], and the content of the polymer dispersant is represented by XB [percent by mass], $0.3 \leq XB/XD \leq 2.0$ is preferably satisfied, $0.5 \leq XB/XD \leq 1.5$ is more preferably satisfied, and $0.6 \leq XB/XD \leq 1.2$ is further preferably satisfied. When the relationship as described above is satisfied, the dispersion stability of the colorant and the storage stability of the ink composition are further improved. In addition, when this ink composition is used as an ink jet ink, a particularly excellent ejection stability can be obtained.

Aqueous Medium

The ink composition according to this embodiment includes an aqueous medium. As the aqueous medium, for example, water or a mixed medium containing water and a hydrophilic solvent may be mentioned. As the hydrophilic solvent, the solvent described as the constituent element of the colorant dispersion liquid may be preferably used.

Although not particularly limited, the lower limit of the content of the water in the ink composition according to this embodiment is preferably 40 percent by mass, more preferably 45 percent by mass, and particularly preferably 50 percent by mass. In addition, although not particularly limited, the upper limit of the content of the water is preferably 85 percent by mass, more preferably 80 percent by mass, and particularly preferably 75 percent by mass. Accordingly, the viscosity of the ink composition can be more reliably adjusted to a preferable value. In addition, when this ink composition is used as an ink jet ink composition, a particularly excellent ejection stability can be obtained.

The lower limit of the content of the hydrophilic solvent in the ink composition according to this embodiment is preferably 0 percent by mass, more preferably 10 percent by mass, and particularly preferably 15 percent by mass. In addition, the upper limit of the content of the hydrophilic solvent is preferably 45 percent by mass, more preferably 43 percent by mass, and particularly preferably 40 percent by mass. Accordingly, an effect obtained by including the hydrophilic solvent can be more significantly obtained.

Surfactant

The ink composition according to this embodiment may include a surfactant. Accordingly, the wettability of the ink composition to a recording medium can be made more preferable. As a result, for example, the quality of an image to be formed using this ink composition can be made more preferable.

As the surfactant, the surfactant described as the constituent element of the colorant dispersion liquid may be preferably used. Accordingly, an effect similar to that described above can be obtained.

When the ink composition according to this embodiment includes a silicone-based surfactant, the lower limit of the content of the silicone-based surfactant in the ink composition with respect to 100 parts by mass of the colorant is preferably 5.0 parts by mass, more preferably 7.0 parts by mass, and particularly preferably 10 parts by mass. In addition, the upper limit of the content of the silicone-based surfactant in the ink composition with respect to 100 parts by mass of the colorant is preferably 150 parts by mass, more preferably 140 parts by mass, and particularly preferably 70 parts by mass. Accordingly, an effect obtained by including the silicone-based surfactant described above can be more significantly obtained.

Other Components

The ink composition according to this embodiment may include at least one component other than the components described above. As the at least one component, the components described as the constituent elements of the colorant dispersion liquid may be preferably used.

The lower limit of the surface tension of the ink composition according to this embodiment at 25° C. is preferably 20 mN/m, more preferably 21 mN/m, and particularly preferably 23 mN/m. In addition, the upper limit of the surface tension is preferably 50 mN/m, more preferably 40 mN/m, and particularly preferably 30 mN/m. Accordingly, for example, clogging of a nozzle of a liquid droplet ejection head is not likely to occur, and the ejection stability of the ink composition is further improved. In addition, even if nozzle clogging occurs, when the nozzle is capped (capping), the recovery property thereby can be made more excellent.

In addition, as the surface tension, a value measured by Wilhelm method may be used. For the measurement of the surface tension, a surface tension meter (such as CBVP-7, manufactured by Kyowa Interface Science Co., Ltd.) may be used.

The lower limit of the viscosity of the ink composition according to this embodiment at 25° C. is preferably 2 mPa·s, more preferably 3 mPa·s, and particularly preferably 4 mPa·s. In addition, the upper limit of the viscosity is preferably 10 mPa·s, more preferably 8 mPa·s, and particularly preferably 6 mPa·s. Accordingly, the fluidity of the ink composition can be made appropriately excellent. In addition, when the ink composition according to this embodiment is used as an ink jet ink composition, a particularly excellent ejection stability can be obtained.

The ink composition according to this embodiment is, in general, received in a container, such as a cartridge, a bag, or a tank, and is then applied to various recording apparatuses, such as a recording apparatus by an ink jet method.

Heretofore, although the preferable embodiments have been described, the present disclosure is not limited thereto.

For example, in the embodiments described above, the case in which the colorant dispersion liquid described above is used as an ink composition or a stock solution thereof has been mainly described, the application of the colorant dispersion liquid described above is not limited thereto, and for example, the colorant dispersion liquid described above may be used as a paint.

4. EXAMPLES

Hereinafter, although the present disclosure will be described in more detail with reference to Examples, the present disclosure is not limited thereto. In the following description, "%" is a mass basis unless otherwise particularly noted.

4.1. Synthesis of Monomer

As a starting raw material of the monomer, ethyl 2-(bromomethyl)acrylate was used. By a reaction with 1-methylimidazole, an ethyl acrylate derivative incorporating an imidazolium salt was obtained. This ethyl acrylate derivative was hydrolyzed by an acid and was then treated with a thionyl chloride, so that an acid chloride was obtained. When this acid chloride is allowed to react, for example, with 1-butanol and isethionic acid, each of which had a hydroxy group, a hydrophobic first monomer and a hydrophilic second monomer were obtained, respectively.

4.2. Experimental Procedure of Examples 1 to 9

After the first monomer, 2-{[carboxymethyl]sulfanylthiocarbonyl]sulfanyl}propionic acid, (CSPA), and azobisisobutyronitrile (AIBN) were dissolved in toluene to have a molar ratio of 300:3:2 and were then freeze-deaerated three times, stirring was performed at 75° C. for 6 hours. After an obtained reaction solution was deposited in methanol, a solid thus obtained was vacuum-dried. Subsequently, after an obtained polymer, the second monomer, and AIBN were added to N-methyl pyrrolidone (NMP) to have a monomer molar ratio of 1:1 and a second monomer/AIBN molar ratio of 100:1, freeze deaeration was performed three times, and heating was then performed at 75° C. for 6 hours. An obtained reaction solution was diluted with tetrahydrofuran (THF) and was deposited in hexane. After a supernatant was removed, vacuum drying was performed. The first monomer and the second monomer of each Example are shown in Table 1.

4.3. Experimental Procedure of Examples 10 to 18

In Examples 10 to 18, a synthetic method by living polymerization using an organotellurium was used. A segment formed from the linear first monomer was obtained by living radical polymerization using an organotellurium. This segment was used as an initiator, and a branched portion synthesis of the second monomer was performed. A polymer obtained by polymerization of the first monomer was used as a chain transfer agent, and a segment formed from a branched second monomer was synthesized. To this linear homopolymer, the second monomer (1 mol), a branching agent "CH$_2$=C(TeMe) (Me)" (30 mmol), and AIBN (0.4 mmol) were added, and heating and stirring were performed in toluene at 60° C. for 60 hours. After THF was added to a reaction solution thus obtained, Me3SiTeMe (64 mmol) and methanol (0.34 mol) were added and then stirred at room temperature for 1 hour. After a solution thus obtained was deposited in hexane, a polymer dispersant having a branched hydrophilic portion was obtained by centrifugal separation. The first monomer and the second monomer of each Example are shown in Tables 1 and 2. In addition, in Tables 1 and 2, the generation of branches is shown. Incidentally, the generation of branches indicates the number of braches of a dendrimer.

4.4. Experimental Procedure of Examples 19 to 27

After the first monomer, CSPA, and AIBN were dissolved in toluene to have a molar ratio of 300:3:2 and were then freeze-deaerated three times, stirring was performed at 75° C. for 6 hours. After an obtained reaction solution was deposited in methanol, a solid thus obtained was vacuum-dried. Subsequently, after an obtained polymer, the second monomer, and AIBN were added to NMP to have a monomer molar ratio of 1:1 and a second monomer/AIBN molar ratio of 100:1, freeze deaeration was performed three times, and heating was then performed at 75° C. for 6 hours. An obtained reaction solution was diluted with THF and was deposited in hexane. After a supernatant was removed, vacuum drying was performed. Furthermore, after this polymer, a third monomer, and AIBN were added to NMP to have a first monomer/second monomer/third monomer molar ratio of 2:1:1 and a third monomer/AIBN molar ratio of 100:1, freeze deaeration was performed three times, and heating was then performed at 75° C. for 6 hours. An obtained reaction solution was diluted with THF and was deposited in hexane. After a supernatant was removed, vacuum drying was performed. This polymer and methyl iodide in an amount of 1.3 times that of the third monomer were added in THF and were then heated and stirred at 60° C. for 20 hours. A reaction solution thus obtained was deposited in hexane, and vacuum drying was performed. The first monomer, the second monomer, and the third monomer of each Example are shown in Table 2.

4.5. Comparative Example 1

Except for that as the polymer dispersant, a styrene-methyl methyl acrylate block copolymer, "MS-10B" manufactured by NOF Corporation, was used, a procedure similar to that for the other Examples was performed. The number average molecular weight of the block copolymer was 197,000.

TABLE 1

| | | EXAMPLE | | | | | | |
|---|---|---|---|---|---|---|---|---|
| | | 1 | 2 | 3 | 4 | 5 | 6 | 7 |
| COLORANT | P.B. 15:3 | 3.0 | 3.0 | 3.0 | 3.0 | 3.0 | 3.0 | 3.0 |
| POLYMER DISPERSANT | | 1.0 | 1.0 | 1.0 | 1.0 | 1.0 | 1.0 | 1.0 |
| MONOMER COMPOSITION AND GENERATION | HYDROPHOBIC PORTION (FIRST MONOMER) | OBu | OPh | CH | OBu | OPh | CH | OBu |
| | HYDROPHILIC PORTION (SECOND MONOMER) | SO4 | SO4 | SO4 | EO | EO | EO | COO |
| | THIRD MONOMER | — | — | — | — | — | — | — |
| | GENERATION OF BRANCHES | — | — | — | — | — | — | — |
| OTHERS | DIETHYLENE GLYCOL | 10.0 | 10.0 | 10.0 | 10.0 | 10.0 | 10.0 | 10.0 |
| | BYK-348 | 0.3 | 0.3 | 0.3 | 0.3 | 0.3 | 0.3 | 0.3 |
| | CARBOXYMETHYL CELLULOSE SODIUM SALT | 1.0 | 1.0 | 1.0 | 1.0 | 1.0 | 1.0 | 1.0 |

TABLE 1-continued

|  |  |  |  |  |  |  |  |  |
|---|---|---|---|---|---|---|---|---|
|  | TRIETHANOLAMINE | 1.0 | 1.0 | 1.0 | 1.0 | 1.0 | 1.0 | 1.0 |
|  | 1,2-HEXANDIOL | 3.0 | 3.0 | 3.0 | 3.0 | 3.0 | 3.0 | 3.0 |
|  | ION-EXCHANGED WATER | BALANCE | BALANCE | BALANCE | BALANCE | BALANCE | BALANCE | BALANCE |
| TOTAL |  | 100 | 100 | 100 | 100 | 100 | 100 | 100 |
| EVALUATION RESULT | PARTICLE SIZE DISTRIBUTION | A | A | A | A | A | A | A |
|  | CHANGE IN PARTICLE SIZE DISTRIBUTION AT 60° C. FOR 5 DAYS | A | A | B | A | A | B | A |
|  | CONTINUOUS EJECTION STABILITY | A | A | B | A | A | B | B |
|  | VISCOUS PROPERTY | A | A | A | B | B | B | B |
|  | RUBBING FASTNESS | A | A | A | B | B | B | B |

|  |  | EXAMPLE | | | | | | |
|---|---|---|---|---|---|---|---|---|
|  |  | 8 | 9 | 10 | 11 | 12 | 13 | 14 |
| COLORANT | P.B. 15:3 | 3.0 | 3.0 | 3.0 | 3.0 | 3.0 | 3.0 | 3.0 |
| POLYMER DISPERSANT |  | 1.0 | 1.0 | 1.0 | 1.0 | 1.0 | 1.0 | 1.0 |
| MONOMER COMPOSITION AND GENERATION | HYDROPHOBIC PORTION (FIRST MONOMER) | OPh | CH | OBu | OPh | CH | OBu | OPh |
|  | HYDROPHILIC PORTION (SECOND MONOMER) | COO | COO | SO4 BRANCH | SO4 BRANCH | SO4 BRANCH | EO BRANCH | EO BRANCH |
|  | THIRD MONOMER | — | — | — | — | — | — | — |
|  | GENERATION OF BRANCHES | — | — | 3 | 3 | 3 | 3 | 3 |
| OTHERS | DIETHYLENE GLYCOL | 10.0 | 10.0 | 10.0 | 10.0 | 10.0 | 10.0 | 10.0 |
|  | BYK-348 | 0.3 | 0.3 | 0.3 | 0.3 | 0.3 | 0.3 | 0.3 |
|  | CARBOXYMETHYL CELLULOSE SODIUM SALT | 1.0 | 1.0 | 1.0 | 1.0 | 1.0 | 1.0 | 1.0 |
|  | TRIETHANOLAMINE | 1.0 | 1.0 | 1.0 | 1.0 | 1.0 | 1.0 | 1.0 |
|  | 1,2-HEXANDIOL | 3.0 | 3.0 | 3.0 | 3.0 | 3.0 | 3.0 | 3.0 |
|  | ION-EXCHANGED WATER | BALANCE | BALANCE | BALANCE | BALANCE | BALANCE | BALANCE | BALANCE |
| TOTAL |  | 100 | 100 | 100 | 100 | 100 | 100 | 100 |
| EVALUATION RESULT | PARTICLE SIZE DISTRIBUTION | A | A | A | A | A | A | A |
|  | CHANGE IN PARTICLE SIZE DISTRIBUTION AT 60° C. FOR 5 DAYS | A | B | A | A | B | A | A |
|  | CONTINUOUS EJECTION STABILITY | B | B | A | A | B | A | A |
|  | VISCOUS PROPERTY | B | B | A | A | A | A | A |
|  | RUBBING FASTNESS | B | B | A | A | A | B | B |

TABLE 2

|  |  | EXAMPLE | | | | | | |
|---|---|---|---|---|---|---|---|---|
|  |  | 15 | 16 | 17 | 18 | 19 | 20 | 21 |
| COLORANT | P.B. 15:3 | 3.0 | 3.0 | 3.0 | 3.0 | 3.0 | 3.0 | 3.0 |
| POLYMER DISPERSANT |  | 1.0 | 1.0 | 1.0 | 1.0 | 1.0 | 1.0 | 1.0 |
| MONOMER COMPOSITION AND GENERATION | HYDROPHOBIC PORTION (FIRST MONOMER) | CH | OBu | OPh | CH | OBu | OPh | CH |
|  | HYDROPHILIC PORTION (SECOND MONOMER) | EO BRANCH | COO BRANCH | COO BRANCH | COO BRANCH | SO4 BRANCH | SO4 BRANCH | SO4 BRANCH |
|  | THIRD MONOMER | — | — | — | — | 4VP | 4VP | 4VP |
|  | GENERATION OF BRANCHES | 3 | 3 | 3 | 3 | — | — | — |
| OTHERS | DIETHYLENE GLYCOL | 10.0 | 10.0 | 10.0 | 10.0 | 10.0 | 10.0 | 10.0 |
|  | BYK-348 | 0.3 | 0.3 | 0.3 | 0.3 | 0.3 | 0.3 | 0.3 |
|  | CARBOXYMETHYL CELLULOSE SODIUM SALT | 1.0 | 1.0 | 1.0 | 1.0 | 1.0 | 1.0 | 1.0 |

TABLE 2-continued

|  |  |  |  |  |  |  |  |  |
|---|---|---|---|---|---|---|---|---|
|  | TRIETHANOLAMINE | 1.0 | 1.0 | 1.0 | 1.0 | 1.0 | 1.0 | 1.0 |
|  | 1,2-HEXANDIOL | 3.0 | 3.0 | 3.0 | 3.0 | 3.0 | 3.0 | 3.0 |
|  | ION-EXCHANGED WATER | BALANCE | BALANCE | BALANCE | BALANCE | BALANCE | BALANCE | BALANCE |
| TOTAL | | 100 | 100 | 100 | 100 | 100 | 100 | 100 |
| EVALUATION RESULT | PARTICLE SIZE DISTRIBUTION | A | A | A | A | A | A | A |
|  | CHANGE IN PARTICLE SIZE DISTRIBUTION AT 60° C. FOR 5 DAYS | B | A | A | B | A | A | B |
|  | CONTINUOUS EJECTION STABILITY | B | B | B | B | A | A | B |
|  | VISCOUS PROPERTY | A | A | A | A | A | A | A |
|  | RUBBING FASTNESS | B | B | B | A | A | A | B |

|  |  | EXAMPLE | | | | | | COMPARATIVE EXAMPLE |
|---|---|---|---|---|---|---|---|---|
|  |  | 22 | 23 | 24 | 25 | 26 | 27 | 1 |
| COLORANT | P.B. 15:3 | 3.0 | 3.0 | 3.0 | 3.0 | 3.0 | 3.0 | 3.0 |
| POLYMER DISPERSANT |  | 1.0 | 1.0 | 1.0 | 1.0 | 1.0 | 1.0 | 1.0 |
| MONOMER COMPOSITION AND GENERATION | HYDROPHOBIC PORTION (FIRST MONOMER) | OBu | OPh | CH | OBu | OPh | CH | STYRENE/ LINEAR CHAIN |
|  | HYDROPHILIC PORTION (SECOND MONOMER) | EO BRANCH | EO BRANCH | EO BRANCH | COO BRANCH | COO BRANCH | COO BRANCH | ACRYLIC ACID/ LINEAR CHAIN |
|  | THIRD MONOMER | 4VP | 4VP | 4VP | 4VP | 4VP | 4VP | — |
|  | GENERATION OF BRANCHES | — | — | — | — | — | — | — |
| OTHERS | DIETHYLENE GLYCOL | 10.0 | 10.0 | 10.0 | 10.0 | 10.0 | 10.0 | 10.0 |
|  | BYK-348 | 0.3 | 0.3 | 0.3 | 0.3 | 0.3 | 0.3 | 0.3 |
|  | CARBOXYMETHYL CELLULOSE SODIUM SALT | 1.0 | 1.0 | 1.0 | 1.0 | 1.0 | 1.0 | 1.0 |
|  | TRIETHANOLAMINE | 1.0 | 1.0 | 1.0 | 1.0 | 1.0 | 1.0 | 1.0 |
|  | 1,2-HEXANDIOL | 3.0 | 3.0 | 3.0 | 3.0 | 3.0 | 3.0 | 3.0 |
|  | ION-EXCHANGED WATER | BALANCE | BALANCE | BALANCE | BALANCE | BALANCE | BALANCE | BALANCE |
| TOTAL |  | 100 | 100 | 100 | 100 | 100 | 100 | 100 |
| EVALUATION RESULT | PARTICLE SIZE DISTRIBUTION | A | A | A | A | A | A | A |
|  | CHANGE IN PARTICLE SIZE DISTRIBUTION AT 60° C. FOR 5 DAYS | A | A | B | A | A | B | C |
|  | CONTINUOUS EJECTION STABILITY | A | A | B | B | B | B | B |
|  | VISCOUS PROPERTY | A | A | A | A | A | A | C |
|  | RUBBING FASTNESS | B | B | B | B | B | B | C |

Abbreviations shown in Tables 1 and 2 are as follows.
P.B. 15:3: C.I. Pigment Blue 15:3
OBu: butoxy
OPh: phenoxy
CH: cyclohexane
SO4: sulfonic acid
EO: oxyethylene
COO: carboxylic acid
4VP: 4-vinyl pyridine
BYK-348: silicone-based surfactant, manufactured by BYK Japan KK In addition, in Examples 10 to 27, the second block formed of the second monomer had a branched structure.

4.6. Preparation of Colorant Dispersion Liquid

After the polymer dispersant of each Example was received in a cup for a defoaming stirrer, and the components shown in each of Tables 1 and 2 and zirconia beads were added, stirring was performed 10 times, and the beads were then removed using a filter, so that a colorant dispersion liquid was obtained.

4.7. Evaluation Method

The following test was performed on the colorant dispersion liquid of each Example.

4.7.1. Particle Size Distribution and Change Thereof

From the colorant dispersion liquid obtained immediately after the production, the average particle diameter (D50) of a colorant particle was obtained. Subsequently, from the colorant dispersion liquid which was left for five days in an environment at 60° C., the average particle diameter (D50) of the colorant particle was obtained, and an increase rate of the average particle diameter was then obtained. The results evaluated in accordance with the following evaluation criteria are shown in Tables 1 and 2.
Particle Size Distribution
　A: D50 of less than 100 nm
　B: D50 of more than 100 to 300 nm
　C: D50 of more than 300 nm
Change of Particle Size Distribution
　A: increase of D50 of less than 10%
　B: increase of D50 of 10% to less than 30%
　C: increase of D50 of 30% or more

4.7.2. Continuous Ejection Stability

The inks of Examples and Comparative Example described above were each filled in a predetermined container and then left for five days in an environment at 60° C. Subsequently, after the container described above was fitted to a recording apparatus PX-H6000 (manufactured by Seiko Epson Corporation), and the ink jet ink was ejected, the number of times of nozzle clogging obtained by 100,000 continuously ejections through 100 nozzles to TRANSJET Classic (manufactured by Cham Paper) was investigated and evaluated in accordance with the following criteria. It may be said that when the number of times of nozzle clogging is smaller, the ejection stability is more excellent. In addition, the recording apparatus (printer) was operated at 40° C. and 20 RH %.

The evaluation results evaluated in accordance with the following criteria are shown in Tables 1 and 2.
　A: No clogging by 100,000 continuous ejections through 100 nozzles
　B: 10 times of clogging or less by 100,000 continuous ejections through 100 nozzles
　C: more than 10 times of clogging by 100,000 continuous ejections through 100 nozzles

4.7.3. Viscous Property

From the inks of Examples and Comparative Example obtained immediately after the production, a shear viscosity at a shear rate of 10 $[s^{-1}]$ was obtained in an environment at 25° C. using a viscoelastic tester (MCR-300, manufactured by Pysica) and was then evaluated in accordance with the following criteria. When the viscosity is high, the ejection stability by an ink jet method is degraded, and in addition, head clogging may occur in some cases.

The evaluation results evaluated in accordance with the following criteria are shown in Tables 1 and 2.
　A: Viscosity at a shear rate of 10 (1/s) is 5±1 mPa·s.
　B: Viscosity at a shear rate of 10 (1/s) is more than 5 to 10 mPa·s.
　C: Viscosity at a shear rate of 10 (1/s) is more than 10 mPa·s.

4.7.4. Rubbing Fastness

As an index of the fastness (fixing property of pigment) of ink against abrasion, a rubbing fastness test in accordance with JIS L 0849 (test methods for color fastness to rubbing) was performed using a friction tester type II (Gakushin type tester). In particular, first, the following recording medium 1 to recording medium 4 were each cut into an A4 size and then adhered to woodfree paper (manufactured by Hokuetsu Kishu Paper Co., Ltd.) with a double-sided adhesive tape. The reason this procedure was performed was that when a cloth is used for an ink jet printer which uses paper or the like as a recording medium, transport defect may occur in some cases. In addition, the recording media 1 and 2 each contained a cellulose, and the recording media 3 and 4 each contained no cellulose.
　Recording medium 1: cotton cloth (manufactured by Hokuetsu Kishu Paper Co., Ltd.)
　Recording medium 2: hemp cloth (manufactured by Takemi Cloth Corporation)
　Recording medium 3: polyester cloth (manufactured by Cosmo Textile Co., Ltd.)
　Recording medium 4: silk handkerchief (manufactured by Abasa)

Next, solid printing was performed using an inkjet printer PX-G930 (Seiko Epson Corporation). The printing conditions are: recording resolution 1440×1440 dpi, application amount of 7 mg/sq. inch. Subsequently, the woodfree paper and the double-sided adhesive tape were peeled off, and heating was performed at 145° C. for 10 minutes, so that a sample was prepared. The rubbing fastness test was performed using this sample and then evaluated in accordance with the following criteria, and the results obtained thereby are shown in Tables 1 and 2.
　A: Grade 4-5 to Grade 5
　B: Grade 2-3 to Grade 4
　C: Grade 1-2

4.8. Evaluation Results

The colorant dispersion liquid of each Example, which includes the polymer dispersant having the first block and the second block, has a significantly excellent storage stability while a low viscosity is maintained, the first block including a structural unit derived from the first monomer having an imidazolium salt portion and a hydrophobic portion, and the second block including a structural unit derived from the second monomer having an imidazolium salt portion and a hydrophilic portion.

The present disclosure is not limited to the embodiments described above and may be variously changed and/or modified. For example, the present disclosure includes substantially the same structure (such as the structure in which the function, the method, and the result are the same, or the structure in which the object and the effect are the same) as the structure described in the embodiment. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:
1. A polymer dispersant comprising:
　a first block; and
　a second block,
　wherein the first block includes a structural unit derived from a first monomer having an imidazolium salt portion and a hydrophobic portion,
　the second block includes a structural unit derived from a second monomer having an imidazolium salt portion and a hydrophilic portion, and
　the hydrophobic portion of the first monomer contains an alkyl carboxylate group, a cycloalkyl carboxylate group, or an aryl carboxylate group.

2. The polymer dispersant according to claim 1, wherein the first monomer is a compound represented by the following formula (I),

[Chem. 1]

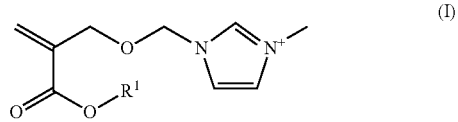

(I)

where in the formula (I), $R^1$ represents a linear or a branched alkyl group having at least two carbon atoms, a cycloalkyl group having at least three carbon atoms, or an aryl group.

3. The polymer dispersant according to claim 1, wherein the hydrophilic portion of the second monomer contains an oligooxyethylene group, a carboxy group, a sulfonic acid group, or a phosphoric acid group.

4. The polymer dispersant according to claim 1, wherein the second monomer is a compound represented by the following formula (II),

[Chem. 2]

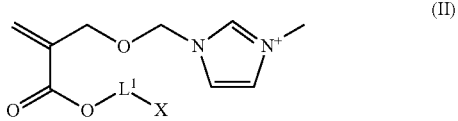

(II)

where in the formula (II), $L^1$ is not present or represents a linear or a branched alkylene group having one to six carbon atoms or an oligooxyethylene group, and X represents a hydrogen atom, a carboxy group, a sulfonic acid group, or a phosphoric acid group.

5. The polymer dispersant according to claim 1, further comprising a third block, wherein the third block includes a structural unit derived from a third monomer having a cationic portion.

6. The polymer dispersant according to claim 5, wherein the cationic portion generates at least one of ammonium, pyridinium, and imidazolium in a solvent.

7. The polymer dispersant according to claim 1, wherein the first block has a branched structure.

8. The polymer dispersant according to claim 1, wherein the second block has a branched structure.

9. The polymer dispersant according to claim 1, wherein the polymer dispersant has a number average molecular weight (Mn) of 8,000 to 20,000 which is measured by a gel permeation chromatography.

10. A colorant dispersion liquid comprising:
a colorant;
a liquid medium; and
the polymer dispersant according to claim 1.

11. An ink composition comprising:
the colorant dispersion liquid according to claim 10.

12. A polymer dispersant comprising:
a first block; and
a second block,
wherein the first block includes a structural unit derived from a first monomer having an imidazolium salt portion and a hydrophobic portion,
the second block includes a structural unit derived from a second monomer having an imidazolium salt portion and a hydrophilic portion, and
the first block has a branched structure.

* * * * *